(12) United States Patent
Rodniansky

(10) Patent No.: US 11,159,539 B2
(45) Date of Patent: *Oct. 26, 2021

(54) MAN-IN-THE-MIDDLE (MITM) CHECKPOINT IN A CLOUD DATABASE SERVICE ENVIRONMENT

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/953,132

(22) Filed: Apr. 13, 2018

(65) Prior Publication Data
US 2019/0319969 A1    Oct. 17, 2019

(51) Int. Cl.
*H04L 29/06*    (2006.01)
*H04L 29/08*    (2006.01)

(52) U.S. Cl.
CPC ...... *H04L 63/1416* (2013.01); *H04L 63/1466* (2013.01); *H04L 67/10* (2013.01)

(58) Field of Classification Search
CPC ............. H04L 63/1466; H04L 63/1441; H04L 63/1416
See application file for complete search history.

(56) References Cited

U.S. PATENT DOCUMENTS

| | | | |
|---|---|---|---|
| 7,240,362 B2 | 7/2007 | Pfitzmann et al. | |
| 8,417,941 B2 | 4/2013 | McCann et al. | |
| 8,869,259 B1 | 10/2014 | Udupa et al. | |
| 9,432,398 B2 | 8/2016 | Iliev et al. | |
| 2010/0088766 A1* | 4/2010 | Michaely | H04L 63/1441 726/23 |
| 2012/0185938 A1* | 7/2012 | Grume | H04L 63/1441 726/23 |

(Continued)

OTHER PUBLICATIONS

Praveena, "An Efficient Tri-factor Authentication for Cloud, Special Issue on Computational Science, Mathematics and Biology," Mar. 16, 2016.

(Continued)

*Primary Examiner* — Dao Q Ho
(74) *Attorney, Agent, or Firm* — Jeffrey S. LaBaw; David H. Judson

(57) ABSTRACT

A technique to protect a cloud database located at a database server and accessible from a database client. In this approach, a communication associated with a database session is intercepted. A hostname or network address associated with the communication is then evaluated to determine whether such information can be found in or otherwise derived from data in a database protocol packet associated with the database session. The information typically is placed there unavoidably by the cloud database client and normally cannot be spoofed by a process that does not understand or speak the proper database protocol semantics. Upon a mismatch, the database session is flagged as being potentially associated with a man-in-the-middle (MITM), in which case a given action may then be taken with respect to the database session that is then active. The technique provides for a MITM checkpoint in a cloud database service environment.

13 Claims, 7 Drawing Sheets

(56) References Cited

U.S. PATENT DOCUMENTS

| | | |
|---|---|---|
| 2013/0139172 A1 | 5/2013 | An et al. |
| 2016/0036841 A1* | 2/2016 | Rodniansky .......... G06F 16/951 |
| | | 713/187 |
| 2016/0218881 A1 | 7/2016 | Adams |
| 2018/0027012 A1* | 1/2018 | Srinivasan ............ H04L 63/101 |
| | | 726/4 |

OTHER PUBLICATIONS

Chandrareddy, et al, "Cloud Zones: Security and Privacy in Cloud Computing," Asian Journal of Information Technology, 2012.
"Man-In-The-Middle," Wikipedia, Mar. 28, 2018, https://en.wikipedia.org/wiki/Man-in-the-middle_attack.

* cited by examiner

700

FROM TCP/IP ADDRESS 10.10.10.1:8059 TO TCP/IP SERVER IP ADDRESS 10.10.10.53:1521

```
         00000000 : 00 6c 00 00 06 00 00 00 00 00 03 7█ 00 01 01 03   .l...........v....
         00000010 : 01 01 01 01 02 01 01 64 76 67 01 0f 0f 41 55 54   .......dvg...AUT
         00000020 : 48 5f 50 52 4f 47 52 41 4d 5f 4e 4d 01 13 13 4a   H_PROGRAM_NM...J
702 {    00000030 : 44 42 43 20 43 6f 6e 6e 65 63 74 20 43 6c 69 65   DBC Connect clie
         00000040 : 6e 74 00 01 0c 0c 41 55 54 48 5f 4d 41 43 48 49   nt....AUTH_MACHI
         00000050 : 4e 45 01 16 16 47 75 61 72 64 72 6c 66 2f 31 39   NE...Guardrlf/19
         00000060 : 32 2e 31 36 38 2e 32 30 2e 33 32 00               2.168.20.32.
```

FROM TCP/IP ADDRESS 10.10.10.1:8059 TO TCP/IP SERVER IP ADDRESS 10.10.10.53:1521

```
         00000000 : 00 ad 00 00 01 00 00 00 01 34 01 2c 00 00 08 00   .........4.,....
         00000010 : 7f ff 4f 98 00 00 00 01 00 8b 00 22 00 00 00 00   ..O........"....
         00000020 : 04 04 28 44 45 53 43 52 49 50 54 49 4f 4e 3d 28   ..(DESCRIPTION=(
         00000030 : 41 44 44 52 45 53 53 3d 28 50 52 4f 54 4f 43 4f   ADDRESS=(PROTOCO
         00000040 : 4c 3d 74 63 70 29 28 50 4f 52 54 3d 31 35 32 31   L=tcp)(PORT=1521
802 {    00000050 : 29 28 48 4f 53 54 3d 31 30 2e 31 30 2e 31 30 2e   )(HOST=10.10.10.
         00000060 : 35 33 29 29 28 43 4f 4e 4e 45 43 54 5f 44 41 54   53))(CONNECT_DAT
         00000070 : 41 3d 28 53 49 44 3d 53 41 4c 45 53 44 42 29 28   A=(SID=SALESDB)(
         00000080 : 43 49 44 3d 28 50 52 4f 47 52 41 4d 3d 29 28 48   CID=(PROGRAM=)(H
         00000090 : 4f 53 54 3d 5f 5f 6a 64 62 63 5f 5f 29 28 55 53   OST=__jdbc__)(US
         000000a0 : 45 52 3d 72 66 61 67 61 6e 29 29 29 29            ER=rfagan))))
```

804

FROM TCP/IP ADDRESS 10.10.10.53:1521 TO TCP/IP SERVER IP ADDRESS 10.10.10.1:8059

FIG. 9

MAN-IN-THE-MIDDLE (MITM) CHECKPOINT IN A CLOUD DATABASE SERVICE ENVIRONMENT

BACKGROUND OF THE INVENTION

Technical Field

This disclosure relates generally to securing resources in a distributed computing environment and, in particular, to the protection of information provided to and from a cloud database.

Background of the Related Art

Existing information security solutions often leave databases vulnerable to advanced hacking techniques and insider attacks. Indeed, databases have been and continue to be a primary target for external hackers and insider attacks. This is because databases contain an organization's most valuable information, including customer records, payment card data, and financial results. Statistics show that hackers are skilled at using techniques, such as cross-site scripting, to penetrate perimeter defenses and reach the database. Existing security solutions, such as intrusion detection systems, lack the knowledge of database protocols and structures required to detect inappropriate activities. Other solutions that rely on native DBMS logs, such as security information and event management (STEM) systems, do not operate in real-time, can be evaded by users with elevated privileges (which hackers often acquire), and may introduce problematic overhead. To address these issues, it is known to provide systems to automatically monitor database transactions, and to respond in real-time to access policy violations. One such system is IBM® InfoSphere™ Guardium®, a unified, cross-platform solution that both protects databases in real-time and automates compliance auditing processes.

The problem of protecting a database is exacerbated as database resources are placed in the cloud. As is well-known, cloud computing is a popular information technology (IT) delivery model by which shared resources, software and information are provided over the Internet to computers and other devices on-demand. Cloud computing can significantly reduce IT costs and complexities while improving workload optimization and service delivery. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Software as a Service (SaaS) refers to the capability provided to the consumer is to use a provider's applications running on a cloud infrastructure. In this model, typically the consumer does not manage or control the underlying cloud infrastructure including network, servers, operating systems, storage, or even individual application capabilities. Database-as-a-service (DBaaS) is a mode of service in which centrally hosted databases are provided for computer applications of organizations. Typically, this kind of service mode is operated by a service provider that deploys various databases in a cluster of computing systems; organizations that need to use the databases order customized services from the service provider and become tenants of the DBaaS service. In this way, different tenants may share the databases running on the service provider's computing systems. In a DBaaS environment, typically the databases run directly on physical machines, however, in the alternative virtual machines (VM) may be employed. DBaaS services may allow multiple applications from different tenants to be connected to a single database running in the computing system, although typically applications from different tenants are isolated from one another.

Enterprises that use cloud database services of this type need to be protected against malicious attempts to intercept sensitive information. Cloud databases store secure information and data sent between an on-premises cloud database client, and a cloud-based database server, and such data often includes personally identifiable information (PII) about individuals and other secret information. The enterprise data may also include other proprietary and confidential information such as technical and business secrets, financial data, HR data, and so forth.

In computer security, a man-in-the-middle attack (MITM) is an attack where the attacker secretly relays and possibly alters the communication between two parties who believe they are directly communicating with each other. Thus, for example, an attacker may make independent connections with the endpoints (e.g., a client, and a server) and relays messages between them to make them believe they are talking directly to each other over a private connection, when in fact the entire conversation is controlled by the attacker. While there are many MITM detection methods that can reveal such attacks (e.g., by analyzing traffic flows at various protocols), a MITM can also be implemented for legitimate purposes, such as a network-based intrusion detector that examines encrypted traffic for malware. Because MITM can be used for both legitimate and illegitimate purposes, it becomes very important to be able to identify the intermediary's true purpose. Indeed, a malicious MITM system can be camouflaged among other legitimate MITM functions. Protecting a database in this scenario can be quite challenging, with attacks and countermeasures typically being implemented in an escalating manner.

Thus, there remains a need to provide new techniques and technologies to detect illegitimate MITM operations in a database access environment, especially where database resources are held in the cloud and thus potentially accessible to multiple entities and applications.

This disclosure addresses this need.

BRIEF SUMMARY

A technique to protect a database located at a database server and accessible from a database client. The database client communicates with the database server over a database protocol. In one embodiment, the database client is located on-premises in an enterprise and acts as a cloud database client, in which case the database server typically is housed in a cloud environment and is accessible via DBaaS. In this approach, a communication (e.g., a new connection request directed to the database server) associated with a database session is intercepted by a host that executes as a MITM "checkpoint." The host may be located on-premises, or in the cloud, and the MITM checkpoint may have responsibility for one or more cloud database clients. In operation, a hostname or network address associated with the communication is evaluated by the MITM checkpoint to determine whether such information can also be found in or otherwise derived from data that the checkpoint finds in one or more database protocol packet(s) associated with the database session. The information in a database protocol packet typically is placed there unavoidably by the cloud database client and normally cannot be spoofed by a process that does not understand or speak the proper database protocol semantics. The data, which is normally passed to the database server as part of the database client connection, is a valuable source of information for MITM phishing attack prevention because it can be used by the MITM checkpoint to validate the true source of the communication.

Thus, according to this disclosure, the information in the database packet(s) is used by the checkpoint to facilitate a determination regarding whether the communication is associated with (e.g., originates from) a legitimate database cloud or possibly an illegitimate MITM. To this end, the evaluation attempts to determine whether the hostname or network address associated with the communication can be found in or derived from data found in one or more of the database protocol packets. If not (i.e., when there is a mismatch between such information), the database session is flagged as being potentially associated with a MITM. In this case, a given action (e.g., terminating the session, issuing a notification, throttling the session, etc.) may then be taken with respect to the session.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates a first representative request intercepted by the MITM checkpoint showing the TCP/IP header information of the communication, as well as representative details of the database protocol packet associated with the database session;

FIG. 8 illustrates a second request intercepted by the MITM checkpoint, as well as the response returned by the database server, to depict an alternative embodiment of the MITM checkpoint operation of this disclosure; and FIG. 9 depicts a third request intercepted by the MITM checkpoint, as well as the response returned by the data server.

DETAILED DESCRIPTION OF AN ILLUSTRATIVE EMBODIMENT

Figure 1:
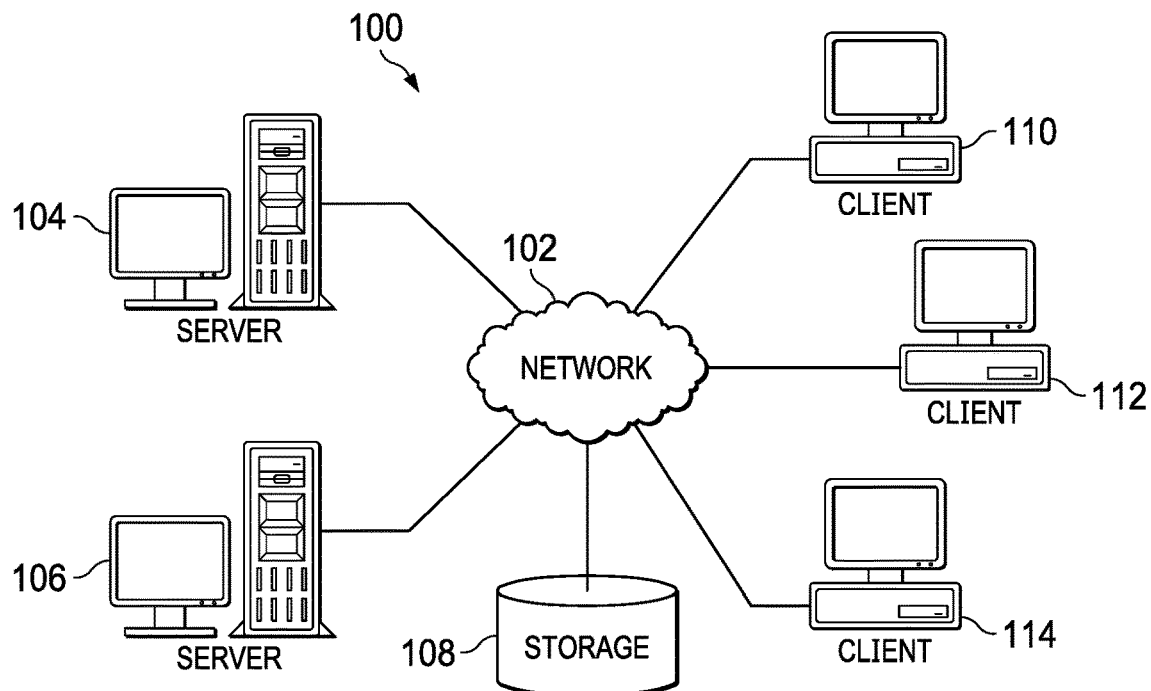
FIG. 1 depicts an exemplary block diagram of a distributed data processing environment in which exemplary aspects of the illustrative embodiments may be implemented.
Figure 2:
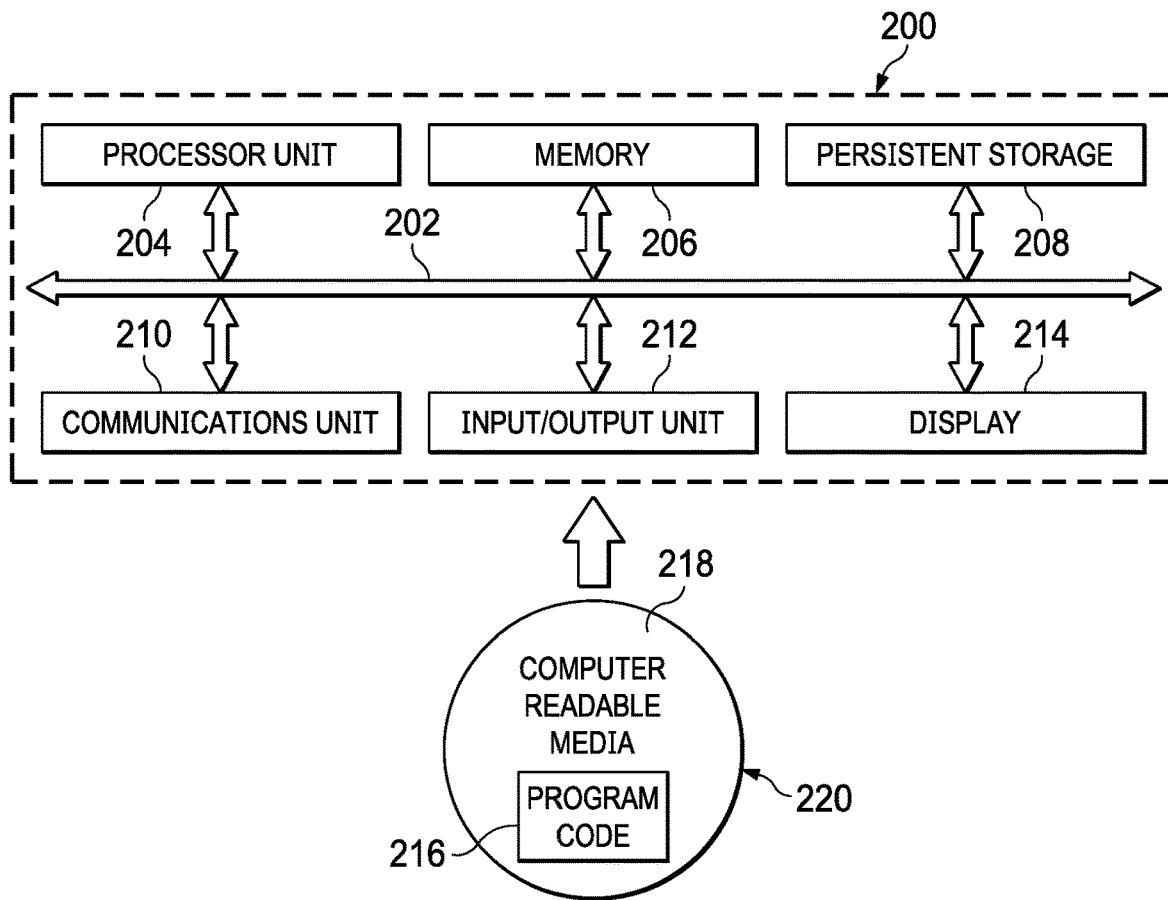
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

Conventionally, network communications between clients and servers follow the Open Systems Interconnection (OSI) 7-layer model, which model comprises a physical layer, data link layer, a network layer, a transport layer, a session layer, a presentation layer, and an application layer. Thus, in an example in which a client directs a communication to a server application, the network Internet Protocol (IP)

address associated with the client-server communication is found at network layer 3, whereas the address of the application typically is found at application layer 7.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Database Access Protection and Auditing

As described above, it is known to provide systems that protect databases in real-time, and that automate compliance auditing processes. One such commercial system is IBM® InfoSphere™ Guardium. The solution supports all major database platforms, enterprise applications, and operating systems (UNIX, Linux, Windows, and z/OS), and it has been extended to distributed systems like Hadoop and supported in the cloud.

Figure 3:
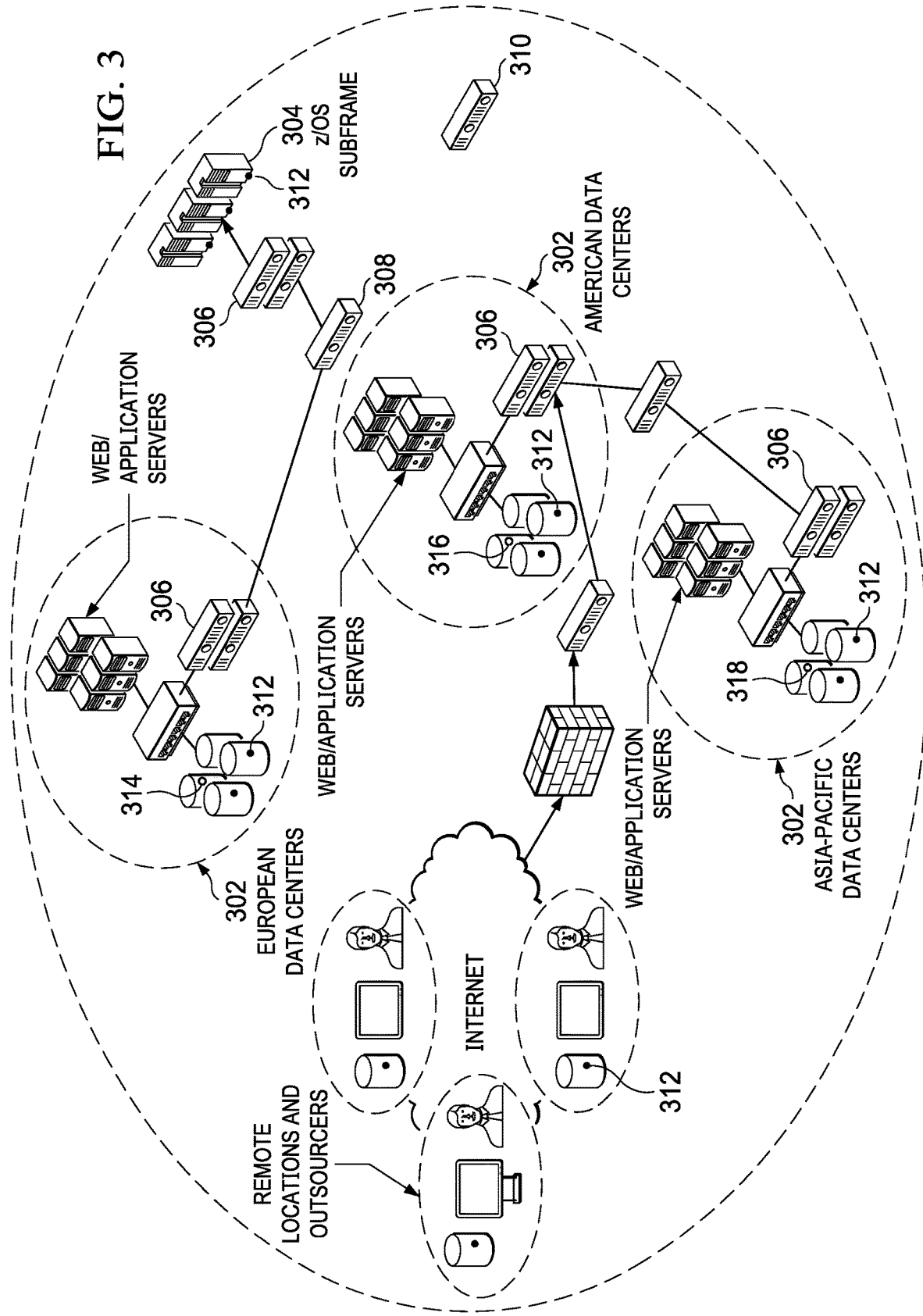
FIG. 3 depicts a known database access monitoring and auditing system.

FIG. 3 depicts a representative implementation of this known system (or "platform") for monitoring several databases across data centers in an enterprise 300. In this embodiment, the enterprise has several data centers 302, as well as internal financial systems 304 that are to be monitored. This architecture typically comprises a set of appliances (hardware and software) and agents (typically software) that can be configured to perform various functions. Appliances typically include the following subcategories: collectors 306, aggregators 308, and a central manager 310. A collector 306 is an appliance that is used for real-time capture and analysis of the database activity. An aggregator 308 is an appliance that is used to reporting activity from the collectors and to provide consolidated reporting from multiple collectors. A central manager (CM) 310 is a specialized functionality that preferably is enabled on an aggregator appliance. The CM function is used to manage and control multiple appliances in the database monitoring system. Agents typically include a software TAP agent (S-TAP®) 312, which is installed on the database server and is used to monitor and relay the observed activity to the Guardium collector appliance. A software TAP is a lightweight software agent installed on a database system server or system. It monitors database system access activity and forwards information about that traffic to a system appliance, which can be deployed anywhere on the network. A particular software TAP agent is installed on or in association with a particular database system server so it can monitor database system-related traffic that is local to that database system.

An installation manager agent (GIM) 314, which is installed on the database server and is used to facilitate agent installation and the updating and configuration modification of agents. A change audit system (CAS) agent 316, which is installed on the database server and is used to capture change audit information of configuration files and more on the database server. An instance discovery agent 318, which is installed on the database server and is used to obtain database, listener, and port information.

As shown in FIG. 3, the software TAP agents 312 may also reside in remote locations, e.g., in trusted partner installations, within the cloud, or the like. Although FIG. 3 illustrates an enterprise with a scalable multi-tier architecture comprising multiple data centers (located across multiple continents), this is not a limitation. The system components may be implemented within a single data center, across multiple data centers that are within the same geographic region, and the like.

A system of this type typically can be deployed in a variety of operational modes. Thus, for example, in a database activity monitoring mode (or in a vulnerability assessment monitoring mode), the collectors 306 monitor and analyze database activity to provide continuous fine-grained auditing and reporting, real-time policy-based alerting and database access controls. Typically, the central manager 310 acts as a single point of management for the entire deployment. With the central manager, system administrators (or other permitted individuals) can define enterprise-wide policies, alerts, queries and reports, install patches, push configuration, and perform a variety of other administrative tasks from a single console. In addition, data from multiple collectors can be aggregated to the aggregation server (the aggregator 308) to provide holistic views and generate enterprise-level reports.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In a typical cloud computing environment, a set of functional abstraction layers are provided. These include a hardware and software layer, a virtualization layer, a management layer, and a workload layer.

The hardware and software layer includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer provides the functionality for which the cloud computing environment is utilized.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, New York. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
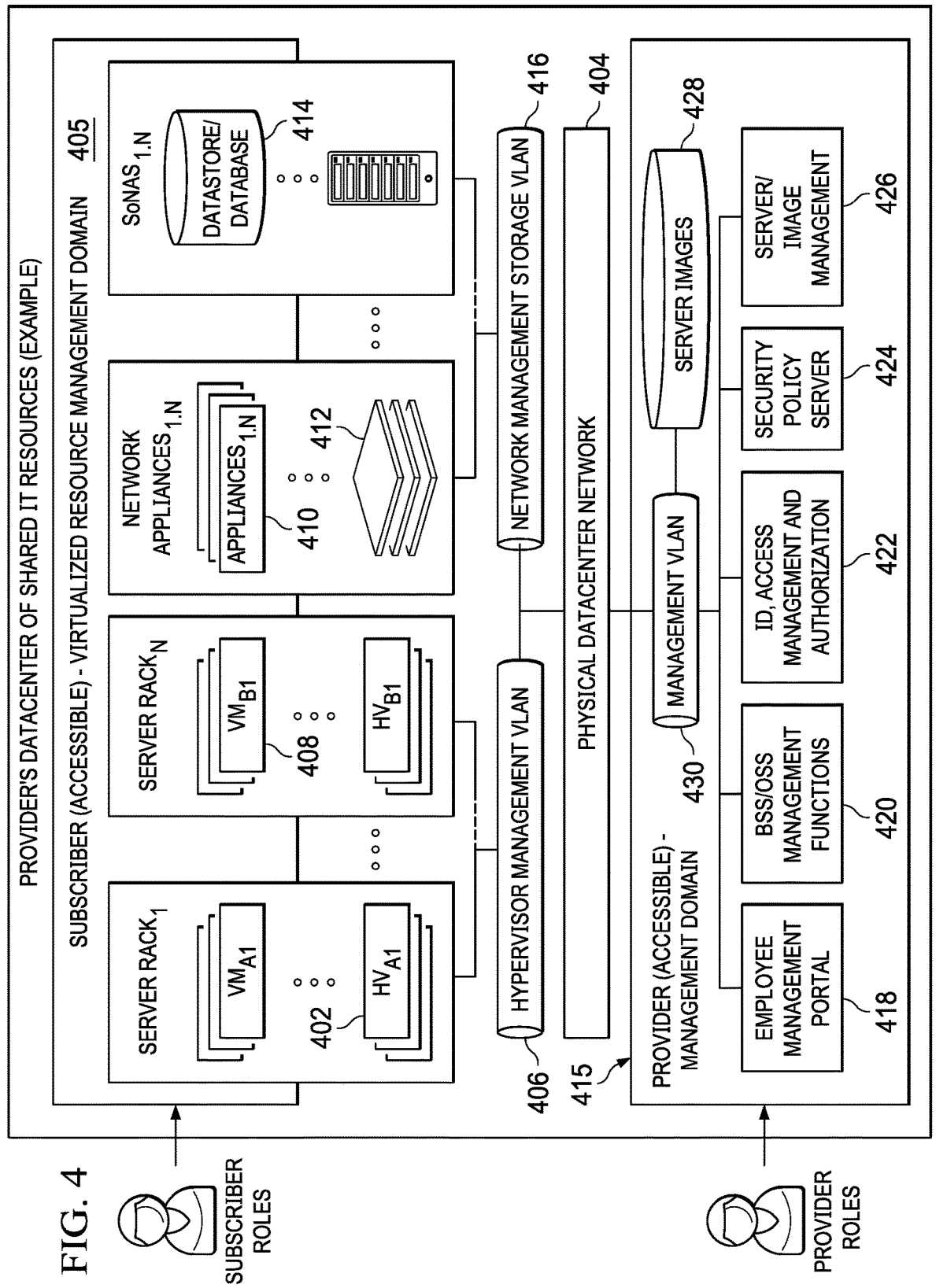
FIG. 4 depicts a representative cloud computing data center in which cloud database services are exposed to cloud database clients.

FIG. 4 illustrates a typical IT infrastructure that supports virtualization of resources and in which the database server(s) are typically housed. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

It is also known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others.

As noted above, a typical use scenario as contemplated by this disclosure is a cloud database that is accessible via DBaaS. A representative but not limiting implementation of a cloud data center may involve multiple tenants that operate in a sharing mode. In this mode, every tenant is allocated with a proprietary virtual machine. Thus, first and second tenants may respectively have exclusive of first and second virtual machines, even if installed on a same physical machine. Typically, each virtual machine then has its own operating system (OS), its owns database server, and its own database. This sharing mode thus uses the virtual machine as the basic unit of resource allocation to control the use of resources by different tenants. In DBaaS, there are also other types of sharing modes of finer granularity that are more suitable for other types of tenants or applications.

MITM Checkpoint in a Cloud Database Service Environment

With the above as background, the technique of this disclosure is now described.

Figure 5:
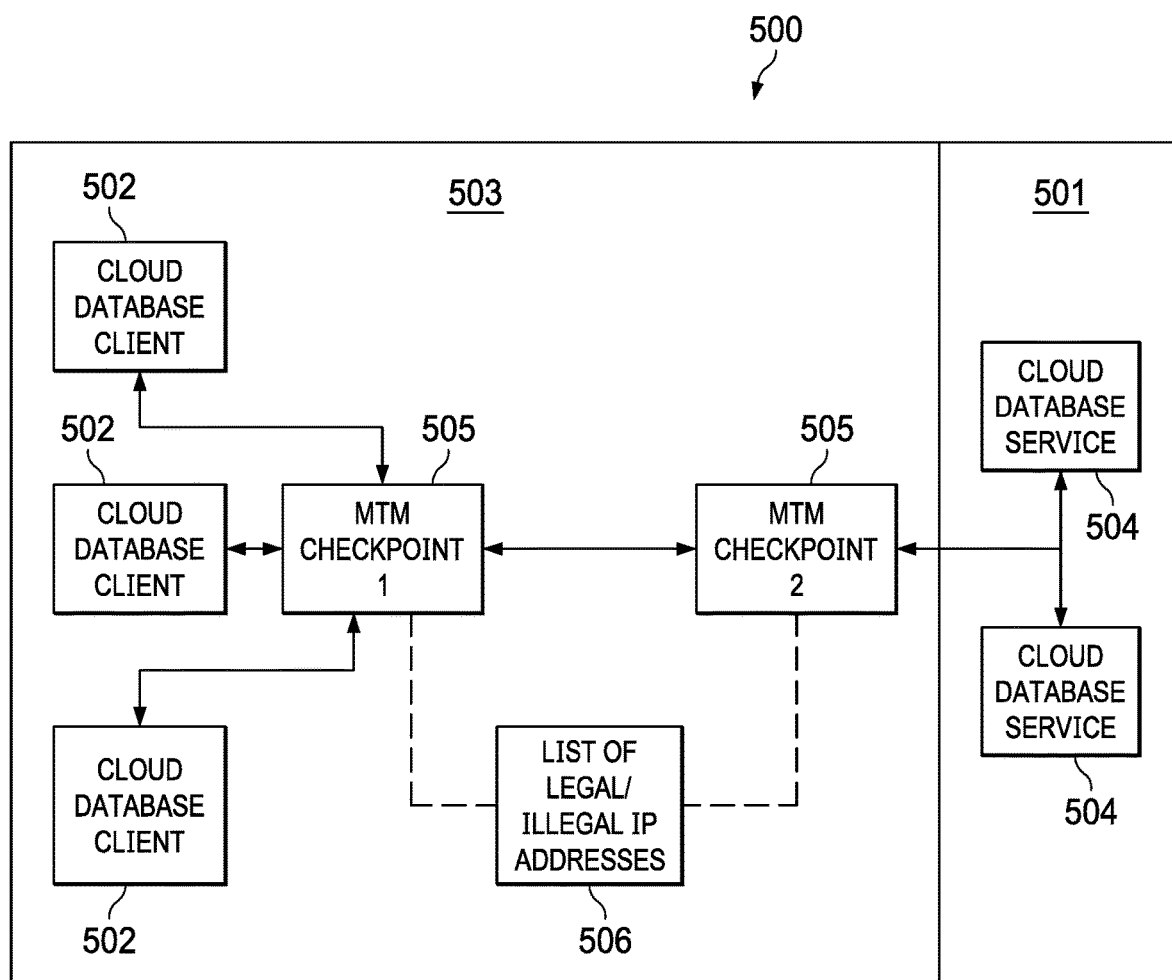
FIG. 5 depicts a typical operating scenario wherein one or more MITM checkpoint hosts of this disclosure are utilized to interface a set of cloud database clients to a set of cloud database services.

FIG. 5 depicts a representation environment in which the subject matter herein may be practiced. As depicted, a database services environment 500 comprises a set of one or more cloud services located in a cloud 501, at least one of which is a cloud database service (e.g., DBaaS), together with a set of database access and security components that are located in or associated with an enterprise private network 503. These database access and security components includes a set of one or more cloud database clients 502, together with a set of one or more MITM checkpoint hosts 505, as will be described. While two MITM checkpoint hosts are depicted, this is not a limitation, as there may be one or more MITM checkpoints or instances of its below-described functionality.

The one or more cloud database clients 502 interact with a set of one or more cloud database services 504 in a conventional manner. Typically, there are multiple database clients associated with a particular database service. A cloud database service 504 is executed on or in association with a database server (or server cluster) implemented in the data center, as was described above in connection with FIG. 4. As is well-known, a typical database server application (e.g., Oracle®, Microsoft® SQL, DB2®, Informix®, Sybase®, etc.) that implements the cloud database service 504 has an associated cloud database client 502, and the client and server communicate with one another in part over a database protocol. The semantics of the database protocol typically are dependent on the database provider and the database application, and these protocol semantics typically vary by vendor.

In the typical but non-limiting use case depicted, the cloud database clients are located on-premises at the enterprise (e.g., in various host machines or systems). Each cloud database client-server may provide a unique database service, or those services may represent multiple instances of the same database service. A cloud database client typically executes on a host machine such as depicted in FIG. 2, and the client interacts with the server in the manner described above with respect to FIG. 1.

According to this disclosure, and as also depicted in FIG. 5, the one or more MITM checkpoint hosts 505 are provided to protect the cloud database service(s) against MITM phishing (or other attacks) in a manner that is now described. The MITM checkpoint functions as a gateway between the enterprise database clients and the cloud database services. The checkpoint operation (described in detail below) may be carried out in a dedicated host as depicted, or the function may reside in some other system, device, appliance, application, program or process. The number and location of the MITM checkpoint host(s) also may vary, and the checkpoint function also may reside in the cloud environment. Or, a first MITM checkpoint may reside within the enterprise private network while a second MITM checkpoint may reside within or near the cloud data center. As shown in FIG. 5, and as will be seen, preferably the checkpoints 505 have access to a list 506 (e.g., a "blacklist") of Internet Protocol (IP) addresses representing systems, devices, machines, processes or programs that have been found (by at least one MITM checkpoint or some other trusted source) to be potentially suspect. Alternatively, the list 506 may be configured as a "whitelist," namely, the list of IP addresses that have been seen and found to be legitimate.

The operation of an MITM checkpoint host (or instance) is now described. As will be seen, the basic purpose of the MITM checkpoint is to protect a database located at a database server and accessible from a database client from phishing, data exfiltration, or other attacks that attempt to obtain database data without authorization. To this end, the MITM checkpoint typically sits within the communication path used by the cloud database client 502 to establish and maintain a database session with its associated cloud database service 504 running in the cloud. By being positioned in the manner, the MITM checkpoint can intercept and examine database requests that originate from the cloud database client (as well as any response thereto issued by the cloud database server), but also it can intercept flows that instead are initiated by an illegitimate MITM. When the MITM checkpoint is located in a trusted environment or is otherwise trusted by the database client and server endpoints, these flows may be in the clear. When the technique is not implemented in a trusted environment, preferably the MITM checkpoint possesses a private key by which it can decrypt communications passing through the checkpoint and then examine the resulting decrypted data for the purposes that are now described. In some implementations, the MITM checkpoint is executed as a function of an existing MITM device (e.g., an IDS, IPS, or other network device that supports a legitimate MITM function).

In particular, and according to this disclosure, a communication (e.g., a new connection request directed to the database server application) associated with a database session is intercepted by a host (or host process) that executes as a MITM "checkpoint." As noted, that communication may or may not originate from a cloud database client. To answer this question, the MITM checkpoint performs an evaluation or test. In particular, preferably a hostname or network address (typically, IP address, or IP address and port number) associated with the communication is evaluated by the MITM checkpoint to determine whether such information can be found in or otherwise derived from data that the MITM checkpoint also finds in one or more database protocol packet(s) associated with the database session. The information in a database protocol packet typically is placed there unavoidably by the cloud database client and cannot be spoofed by a process that does not understand or speak the proper database protocol semantics. This data, which is normally passed to the database server as part of the database client connection, is a valuable source of information for MITM phishing attack prevention because as will be seen it can be used by the MITM checkpoint to validate the true source of the communication.

In particular, the MITM checkpoint evaluation thus determines whether the hostname or network address associated with the communication can be found in or derived from the protocol-specific artifacts that the MITM checkpoint finds in one or more of the database protocol packet(s) that it intercepts or otherwise receives. As the examples below illustrate, when a mismatch between these sets of information occurs, this indicates that the cloud database client may not have been the true source of the communication. Thus, the database session is flagged as being potentially associated with a hostile (or potentially hostile) MITM. In such case, a given action (e.g., terminating the session, throttling back the session, issuing a notification, moving the session to a sandbox for further evaluation, etc.) may then be taken to protect the database. The particular type of action taken may also vary based on one or more other factors, such as time-of-day, type of database request, a determined geographic source of the communication, or the like, all as described or configured in an applicable security policy.

Thus, according to the disclosure, an MITM checkpoint has the ability to read and examine the database protocol packet(s) to determine whether it can find a "match" to the application layer (e.g., hostname) or IP layer (IP address) that it also sees when the communication is intercepted. Typically, the hostname or IP address associated with the communication is found in the communication's host header (or, more generally, within the application layer or TCP/IP data flow), although that information may also be obtained or captured by other means.

Figure 6:
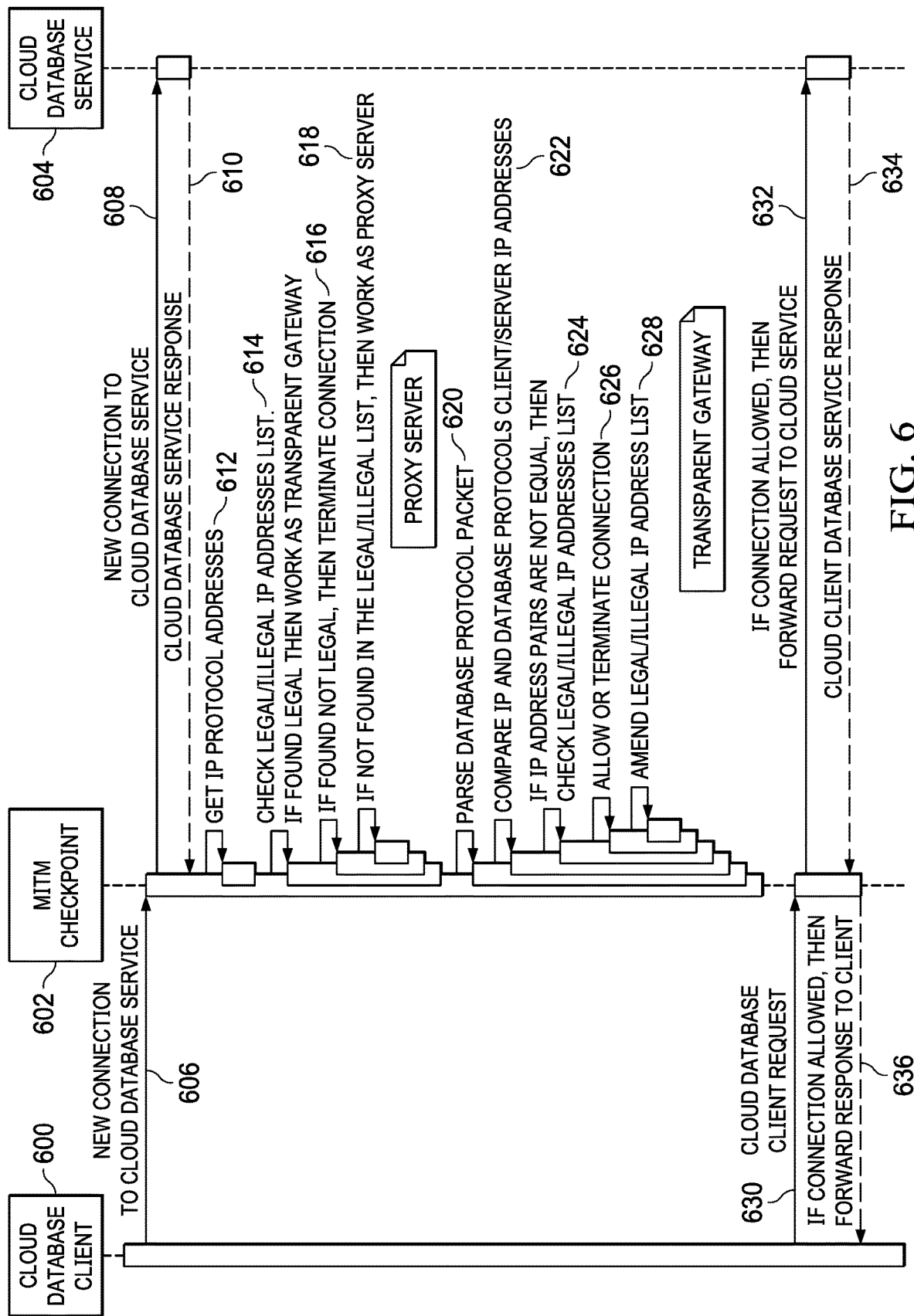
FIG. 6 depicts a process flow of how an MITM checkpoint is utilized to protect a database in accordance with the technique of this disclosure.

FIG. 6 depicts an exemplary operation of the MITM checkpoint 602 that is situated between the cloud database client 600, and the cloud database service (server) 604. The MITM checkpoint typically executes as software, namely, as a set of computer program instructions executed by a hardware processor (or virtual machine). At step 606, a new connection request to the cloud database service is issued, presumably by the cloud database client 600 (although the MITM checkpoint does not necessarily know this for certain). At step 608, the MITM checkpoint forwards the new connection request to the cloud database server 604, which server then responds at step 610 with a cloud database service response. At step 612, the MITM checkpoint 602 examines the connection request (and optionally the response) packet(s) to identify what IP addresses are associated with the communication that is directed to the cloud database service 604. Although not depicted here, the MITM may obtain the relevant IP addresses by resolving (via a Domain Name Service (DNS)) a hostname that is associated with the connection request.

At step 614, the MITM checkpoint 602 checks the IP protocol addresses with a list of IP addresses (506, in FIG. 5) that have found previously to be illegal or otherwise suspect. As noted above, this check may be performed against a blacklist or a whitelist depending how the list is structured. If an IP address associated with the communication is a permitted (legal) IP address (e.g., because it is not on the blacklist or is found on the whitelist), then the MITM checkpoint continues to operate as a transparent gateway to the cloud database service. If, however, the IP address is not a permitted IP address (e.g., because it is present on the blacklist or has been seen before but is not on the whitelist), the MITM checkpoint typically terminates the connection, as depicted at step 616.

If, however, the IP address in question is not found at all (e.g., because it has never been seen before), the MITM checkpoint continues at step 618 by switching into a proxy mode of operation. At step 620, and while operating as a proxy server, the MITM checkpoint then parses the database protocol packet. This operation may involve the MITM checkpoint decrypting the communication if necessary, as noted above. At step 622, the MITM checkpoint compares the application layer or IP layer information from the communication (typically source IP address) with the similar data found in or otherwise derivable by the MITM checkpoint from the database packet(s) themselves. As will be seen in the examples described below, typically this data is or resolves to an IP address so that step 622 involves just a simple comparison of IP addresses for a match. When the IP address pairs do not match, the routine then continues at step 624 to check whether the IP address obtained from the database packet is on the blacklist or whitelist; the MITM checkpoint then takes the follow-on action at step 626 that it has been configured to take (e.g., by a security policy when a suspect IP address has been identified. As noted above, the particular action may vary but typically is one of: allowing the connection, terminating the connection, throttling back the connection, issuing a notification, logging the event, transferring the connection to a sandbox for further evaluation, and so forth. At step 628, the MITM checkpoint amends the list 506 to include the newly-identified IP address. Step 628 may involve the MITM checkpoint publishing a new list. The MITM checkpoint then transitions from its proxy mode back to being a transparent gateway.

At step 630, the cloud database client sends a client request. If the connection has been allowed (i.e., not terminated at step 626), the MITM checkpoint (operating as a transparent gateway) forwards the request to the cloud service. This is step 632. At step 634, the cloud service issues a database service response, which is then forwarded by the MITM checkpoint to the database client at step 636. Further communications within the database session continue in this manner. This completes the processing.

In a preferred embodiment, there may be multiple checkpoints (such as depicted in FIG. 5) along the path between the database clients and services. A checkpoint analyzes (preferably once per session and per IP address) several of the initial database session packets associated with a session both on the TCP/IP and database protocol level, as has been described above. During this process, the checkpoint acts as a proxy server (preferably for just a short period of several login packets), parses the IP protocol along with one or more database protocol packets, comparing IP addresses found on both levels. Non-matched IP address pairs then reveal the possibility of an MITM attack. Then, and depending on the results of this analysis, the particular MITM checkpoint acts as database session firewall, in effect selectively blocking the connection to the cloud database service (preventing MITM attack in real time), or instead acts as an efficient gateway just forwarding network traffic between client and server endpoints. Preferably, each MITM checkpoint maintains and makes available to the other MITM checkpoints the list(s) of legal and illegal IP addresses learned through the IP address comparison that the MITM checkpoint carries out on a run-time basis in the manner described.

The particular type of analysis performed by the MITM checkpoint typically is database protocol-dependent. In particular, the database protocols of many database applications (e.g., Oracle, Microsoft SQL, DB2, Informix and Sybase) include or encode in the database protocol packets client and server hostname information that is sent implicitly (in other words, the database client is not aware of this information). The following provides several examples.

FIG. 7 depicts a first example (involving a session directed to an Oracle database application). In this example, the header 700 represents information from the TCP/IP protocol level that is captured by the MITM checkpoint; the database protocol packet 702 is shown below. In this example, and as can be seen by the MITM checkpoint, the connection originates from IP address 10.10.10.1 (OSI network layer 3) and port 8059 (OSI transport layer 4), but IP address information in the actual database protocol packet shows that the client that initiated the connection request resides on Guardrlf/192.168.20.32. This IP address pair mismatch indicates 10.10.10.1 as a potential MITM that then needs to be legally approved or disapproved.

FIG. 8 depicts a second traffic flow example (also Oracle) wherein the header 800 includes the source IP address 10.10.10.1 whereas the database protocol packet 802 contains the database server IP address 10.10.10.53. Once again, this IP address pair mismatch indicates a potential MITM phishing attack. In this example scenario, and as an optional check, the MITM checkpoint also checks the response coming back from the database server. This response is also depicted, and it includes the TCP/IP protocol level header 804, and the actual database protocol packet 806. In this example, the MITM checkpoint can use the information in the server response as an additional check or verification that the IP address mismatch (in the header 800 and the inbound packet 802) in fact indicates a potential attack. To this end, the information is the server response here indicates that the database server is in fact located at 10.10.10.53 and that it has served an actual response, thereby confirming that the original IP mismatch does indicate a suspect condition.

FIG. 9 depicts another example traffic flow, in this case for a session directed to a Microsoft SQL database server. This is an example of a scenario in which the database packet includes both a database client hostname, and a database server hostname. In this example, the source IP address in the header 902 is 10.116.32.82, and the database packet 904 includes the client hostname IL-TLV-DSELA3, and the database server host name IL-TLV-SQL1. Using DNS, the MITM checkpoint resolves these names to IP addresses, such as 10.116.32.82 and 10.115.243.37 respectively. Because there is no IP address pair mismatch, there is no illicit MITM between the database client and the database cloud service in this example. This situation can then be confirmed by the MITM checkpoint by an optional check on the database server response (header 904 and database packet 906), which in this case arrives from IP address 10.115.243.37. Because there is an IP address match, this secondary check confirms that IP address 10.115.242.37 is also not an illicit MITM. In particular, if there had been a discrepancy found in the server IP addresses, then it can indicate the existence of an illicit MITM located in the cloud.

The above examples depict that the IP address pair match evaluation may be carried out based on information provided by the database client (the usual case), or information provided by the database server, or both. Preferably, and has been described, the IP address pair match is evaluated based on the network IP addresses extracted on OSI layer 3 (the IP protocol) and OSI layer 7 (the database protocol)

The subject matter herein provides numerous advantages. It provides for an improved and more secure operation of a database services environment and, in particular, provides efficient and scalable MITM phishing attack prevention. By using the information that is natively included in the database protocol packet as a check against the application or IP layer semantics associated with the database session communication, the technique provides for an MITM checkpoint in a cloud database service environment that protects the database from harm. A significant advantage is that the technique relies on monitored internal database protocol information that cannot be forged (by an illicit MITM) without consequences. If a malicious MITM forges database protocol level information, such activity can be detected, e.g., by cloud service database security auditing systems. And, even if the malicious MITM does not forge database protocol level information, the existence of that entity can still be detected (and acted upon) by the MITM checkpoint.

The placement of the MITM checkpoint within the client-server traffic flow (as a transparent gateway) and its limited transition to proxy operation only when needed ensures that the database service is not adversely burdened by the MITM checkpoint processing. The approach herein is highly scalable and enables efficient checking on database service flows associated with the cloud database service.

The cloud operating environment described above is not intended to be limited, as the techniques described below may be implemented in any operating environment in which database clients interact with database services (servers).

Generalizing, the functionality described above (in whole or in part) may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various other server-side architectures including simple n-tier architectures, web portals, federated systems, and the like. As noted, an MITM checkpoint itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the central manager or agent functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the checkpoint functions are implemented in a computer (which may be a special purpose computer), preferably in software executed by one or more processors. The software is maintained in one or more data stores or memories associated with the one or more processors, and the software may be implemented as one or more computer programs. Collectively, this hardware and software comprises the system described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein may also be used for filesystem monitoring and access control.

The techniques herein provide for improvements to another technology or technical field, namely, database systems, as well as improvements to the functioning of distributed systems used to manage and control such database systems.

Having described my invention, what I claim is as follows:

The invention clamed is:

1. Apparatus to protect a cloud database located at a database server and accessible from a database client, wherein the database client communicates with the database server over a database protocol, comprising:
a processor;
computer memory holding computer program instructions executed by the processor, the computer program instructions configured to:
intercept a communication associated with a database session, the database session being directed to the database server;
determine whether a hostname or network address associated with the communication has been previously seen;
upon a determination that the hostname or network address has not been previously seen, enter a first mode of operation and evaluate whether the hostname or network address is located in or derivable from database protocol-specific artifacts in a database protocol packet associated with the database session; and
when the hostname or network address is not located in or derivable from the database protocol-specific artifacts in the database protocol packet, identify the database session as being potentially associated with a man-in-the-middle instead of the database client.

2. The apparatus as described in claim 1 wherein the communication is one of: a session request initiated by the database client; a response to the session request returned by the database server, and a session request initiated by the database client together with the response to the session request returned by the database server.

3. The apparatus as described in claim 1 wherein the first mode of operation is a proxy mode carried out for a configurable number of login packets associated with the database session.

4. The apparatus as described in claim 1 wherein the computer program instructions are further configured to take an action with respect to the database session that has been determined to be potentially associated with a man-in-the-middle.

5. The apparatus as described in claim 4 wherein the action is one of: terminating the database session, allowing the database session to continue, issuing a notification, throttling the database session, and forwarding the database session for further evaluation.

6. The apparatus as described in claim 1 wherein the computer program instructions are further configured to add the hostname or network address to a list of potentially suspect hostnames or network addresses.

7. The apparatus as described in claim 1 wherein the database client is located within a private network, and the database server and the cloud database are accessible at a third party network.

8. A computer program product in a non-transitory computer readable medium for use in a data processing system, the data processing system configured to protect a cloud database located at a database server and accessible from a database client, and wherein the database client communicates with the database server over a database protocol, the computer program product holding computer program instructions that, when executed by the data processing system, are configured to:
intercept a communication associated with a database session, the database session being directed to the database server;
determine whether a hostname or network address associated with the communication has been previously seen;

upon a determination that the hostname or network address has not been previously seen, enter a first mode of operation and evaluate whether the hostname or network address is located in or derivable from database protocol-specific artifacts in a database protocol packet associated with the database session; and when the hostname or network address is not located in or derivable from the database protocol-specific artifacts in the database protocol packet, identify the database session as being potentially associated with a man-in-the-middle instead of the database client.

9. The computer program product as described in claim 8 wherein the communication is one of: a session request initiated by the database client;

a response to the session request returned by the database server, and a session request initiated by the database client together with the response to the session request returned by the database server.

10. The computer program product as described in claim 8 wherein the first mode of operation is a proxy mode carried out for a configurable number of login packets associated with the database session.

11. The computer program product as described in claim 8 wherein the computer program instructions are further configured to take an action with respect to the database session that has been determined to be potentially associated with a man-in-the-middle.

12. The computer program product as described in claim 11 wherein the action is one of: terminating the database session, allowing the database session to continue, issuing a notification, throttling the database session, and forwarding the database session for further evaluation.

13. The computer program product as described in claim 8 wherein the computer program instructions are further configured to add the hostname or network address to a list of potentially suspect hostnames or network addresses.

* * * * *